United States Patent
Birru et al.

(10) Patent No.: US 12,339,845 B1
(45) Date of Patent: Jun. 24, 2025

(54) METHOD AND SYSTEM FOR TASK PLANNING AND EXECUTION BASED ON USER QUERY

(71) Applicant: Quantiphi, Inc, Marlborough, MA (US)

(72) Inventors: Dagnachew Birru, Marlborough, MA (US); Ankit Prakash, Mumbai (IN); Ayush Dudhe, Mumbai (IN); Sriram Natarajan, Mumbai (IN); Ashwin Sanjeevan, Mumbai (IN); Muneeswaran I, Mumbai (IN); Saisubramaniam Gopalakrishnan, Mumbai (IN); Harpreet Singh, Mumbai (IN); Hamza Moiyadi, Mumbai (IN); Kanishk Mehta, Toronto (CA); Vishal Vaddina, Toronto (CA)

(73) Assignee: QUANTIPHI, INC, Marlborough, MA (US)

( * ) Notice: Subject to any disclaimer, the term of this patent is extended or adjusted under 35 U.S.C. 154(b) by 0 days.

(21) Appl. No.: 18/621,059

(22) Filed: Mar. 28, 2024

(51) Int. Cl.
*G06F 16/2453* (2019.01)
*G06F 16/2455* (2019.01)
*G06F 16/2457* (2019.01)

(52) U.S. Cl.
CPC .. *G06F 16/24542* (2019.01); *G06F 16/24564* (2019.01); *G06F 16/24578* (2019.01)

(58) Field of Classification Search
CPC ......... G06F 16/24542; G06F 16/24564; G06F 16/24578
USPC ....................................................... 707/718
See application file for complete search history.

(56) References Cited

U.S. PATENT DOCUMENTS

| | | | | |
|---|---|---|---|---|
| 7,949,654 B2 * | 5/2011 | Das | ...................... | G06F 16/2471 707/718 |
| 8,688,714 B1 * | 4/2014 | Upstill | ................ | G06F 16/2465 707/754 |
| 2009/0248619 A1 * | 10/2009 | Das | ...................... | G06F 16/2471 |
| 2024/0202220 A1 * | 6/2024 | Arikapudi | ............ | G06F 16/3322 |

FOREIGN PATENT DOCUMENTS

WO    WO-2017196419 A1 * 11/2017 ....... G06F 16/24522

* cited by examiner

*Primary Examiner* — Michael Pham

(57) ABSTRACT

Disclosed is a method comprising receiving user query (UQ) indicative of task (202) associated with retrieval of data (204) from database (206) comprising structured and unstructured data sources (SAUDS) (208) and generating relevant response (RR) (210) for UQ; generating task plan (220) for determining embedding (224) for task, performing retrieval task (226) for identifying relevant SAUDS (228), generating relevance scores (230), and when relevance scores indicate unstructured pipeline (232): triggering unstructured data query engine (UDQE) (234, 306) for retrieving data, and generating RR, or when relevance scores indicate structured pipeline (236): triggering structured data query engine (SDQE) (238, 308) for retrieving data, and generating RR, or when relevance scores indicate hybrid pipeline (240): triggering SDQE for retrieving first portion of data (FPD) (242), transforming received UQ and FPD, triggering UDQE for retrieving second portion of data (SPD) (246), and combining FPD and SPD for generating RR.

10 Claims, 4 Drawing Sheets

METHOD AND SYSTEM FOR TASK PLANNING AND EXECUTION BASED ON USER QUERY

FIELD OF TECHNOLOGY

The present disclosure generally relates to machine learning. Specifically, the present disclosure relates to a method and a system for task planning and execution based on a user query.

BACKGROUND

Conventionally, in computing tasks related to retrieval of data, users provide user queries for specifying the data that is to be retrieved. However, said user queries often extend beyond the retrieval of data, requiring further computing tasks based on the data that is to be retrieved. Although, the present solutions fail to efficiently plan and execute such complex computing tasks indicated in the user queries.

Moreover, in scenarios where the data is to be retrieved from diverse data sources, formats, and content types, then the present solutions fail to effectively identify relevant data sources from where the required data is to be retrieved. Furthermore, the present solutions fail to understand complex user queries and generate meaningful insights based on the user queries without any manual interventions.

Further limitations and disadvantages of conventional approaches will become apparent to one of skill in the art through comparison of such systems with some aspects of the present disclosure, as set forth in the remainder of the present application with reference to the drawings.

BRIEF SUMMARY OF THE DISCLOSURE

The present disclosure provides for a method and a system for task planning and execution based on a user query. The present disclosure seeks to provide a solution to the existing problem of how to effectively and efficiently retrieve data from different types of data sources in an automated manner. An aim of the present disclosure is to provide a solution that overcomes at least partially the problems encountered in the prior art and provide an improved method and system for task planning and execution based on a user query which enables effective and efficient retrieval of data.

In one aspect, the present disclosure provides a method for task planning and execution based on a user query. The method comprises receiving the user query indicative of a task associated with retrieval of data from a database comprising structured and unstructured data sources and generating a relevant response for the user query. Moreover, the method comprises parsing the user query for determining the task associated with the retrieval of the data indicated in the user query, using a Large Language Model (LLM). Furthermore, the method comprises generating a task plan comprising a plurality of sub-tasks for the execution of the task associated with the retrieval of the data, using the LLM, wherein executing the plurality of sub-tasks comprises determining an embedding for the task associated with the retrieval of the data. Moreover, executing the plurality of sub-tasks comprises performing a retrieval task for identifying relevant structured and unstructured data sources from amongst the database for the retrieval of the data, based on the determined embedding. Furthermore, executing the plurality of sub-tasks comprises generating relevance scores for the identified relevant structured and unstructured data sources, based on the determined embedding. Furthermore, executing the plurality of sub-tasks comprises when the relevance scores are indicative of an unstructured pipeline, triggering an unstructured data query engine for searching the identified relevant unstructured data sources and retrieving the data, based on the determined embedding, and generating the relevant response based on the retrieved data, using the LLM, or when the relevance scores are indicative of a structured pipeline, triggering a structured data query engine for searching the identified relevant structured data sources and retrieving the data, based on the determined embedding, and generating the relevant response based on the retrieved data, or when the relevance scores are indicative of a hybrid pipeline, triggering a structured data query engine for searching the identified relevant structured data sources and retrieving a first portion of the data, based on the determined embedding, receiving the first portion of the data and the user query at a query transformer for transforming the received user query and the first portion of data, triggering an unstructured data query engine for searching the identified relevant unstructured data sources and retrieving a second portion of the data, based on the determined embedding, and combining the first portion of the data and the second portion of the data for generating the relevant response thereof.

Beneficially, the embodiments of the present disclosure provide a method that enables effective and efficient retrieval of the data. The method effectively automates a process of task planning for executing the task associated with the retrieval of data. Moreover, the method is able to successfully identify the relevant data sources from which the data is to be retrieved from amongst the database comprising different data sources.

In another aspect, the present disclosure provides a system for task planning and execution based on a user query. The system comprises a processor. The processor is configured to receive the user query indicative of a task associated with retrieval of data from a database comprising structured and unstructured data sources and generate a relevant response for the user query. Moreover, the processor is configured to parse the user query to determine the task associated with the retrieval of the data indicated in the user query, using a Large Language Model (LLM). Furthermore, the processor is configured to generate a task plan comprising a plurality of sub-tasks for the execution of the task associated with the retrieval of the data, using the LLM, wherein to execute the plurality of sub-tasks, the processor is further configured to determine an embedding for the task associated with the retrieval of the data. Moreover, to execute the plurality of sub-tasks, the processor is further configured to perform a retrieval task for identifying relevant structured and unstructured data sources from amongst the database for the retrieval of the data, based on the determined embedding. Furthermore, to execute the plurality of sub-tasks, the processor is further configured to generate relevance scores for the identified relevant structured and unstructured data sources, based on the determined embedding. Furthermore, to execute the plurality of sub-tasks, the processor is further configured to, when the relevance scores are indicative of an unstructured pipeline, trigger an unstructured data query engine to search the identified relevant unstructured data sources and retrieve the data, based on the determined embedding, and generate the relevant response based on the retrieved data, using the LLM, or when the relevance scores are indicative of a structured pipeline, trigger a structured data query engine to search the identified relevant structured data sources and retrieve the data, based on the determined embedding, and generate the relevant response based on the retrieved data, or when the relevance scores are indicative of a hybrid pipeline, trigger a structured data query engine to search the identified relevant structured data sources and retrieve a first portion of the data, based on the determined embedding, receive the first portion of the data and the user query at a query transformer in the processor to transform the received user query and the first portion of data, trigger an unstructured data query engine to search the identified relevant unstructured data sources and retrieve a second portion of the data, based on the determined embedding, and combine the first portion of the data and the second portion of the data to generate the relevant response thereof.

The system achieves all the advantages and technical effects of the method of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not too scaled. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
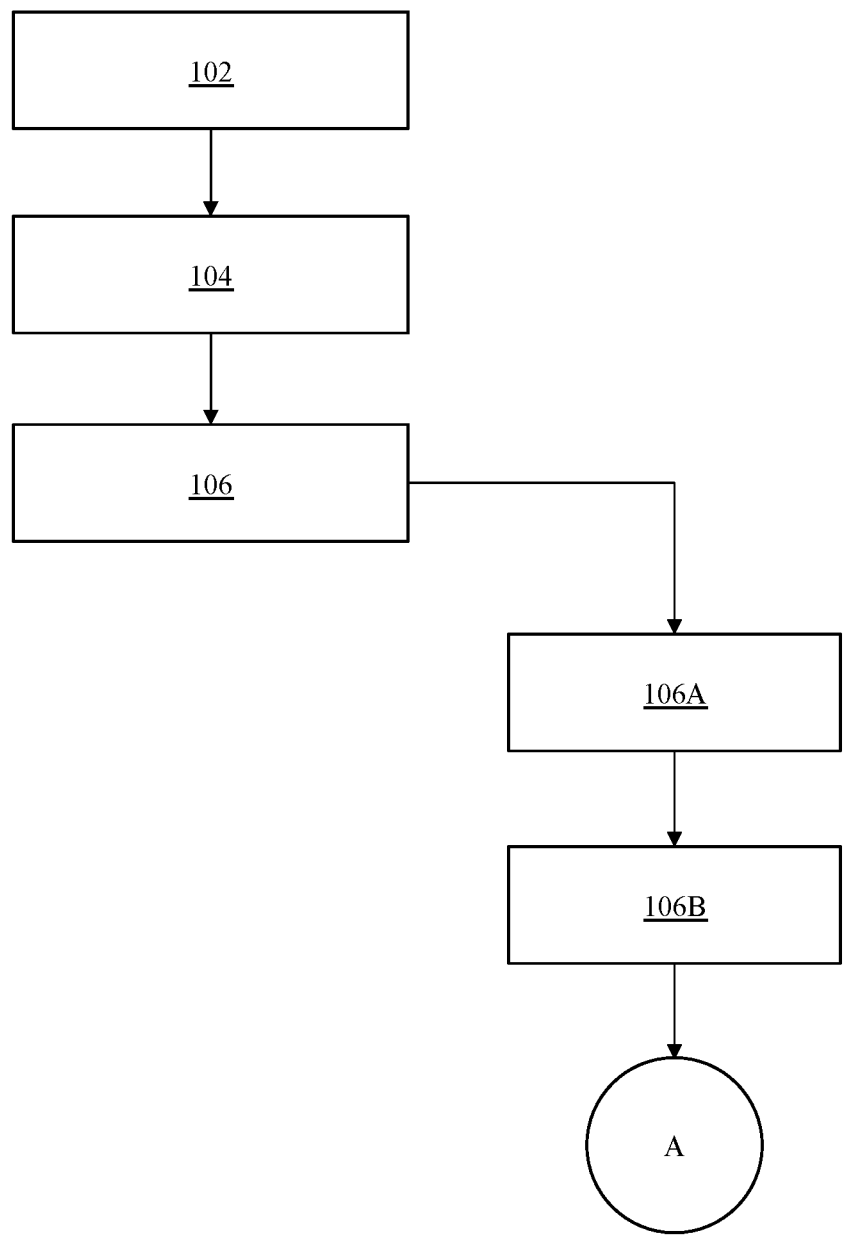
FIGS. 1A and 1B collectively are a flowchart of a method for task planning and execution based on a user query, in accordance with an embodiment of the present disclosure.
Figure 1B:
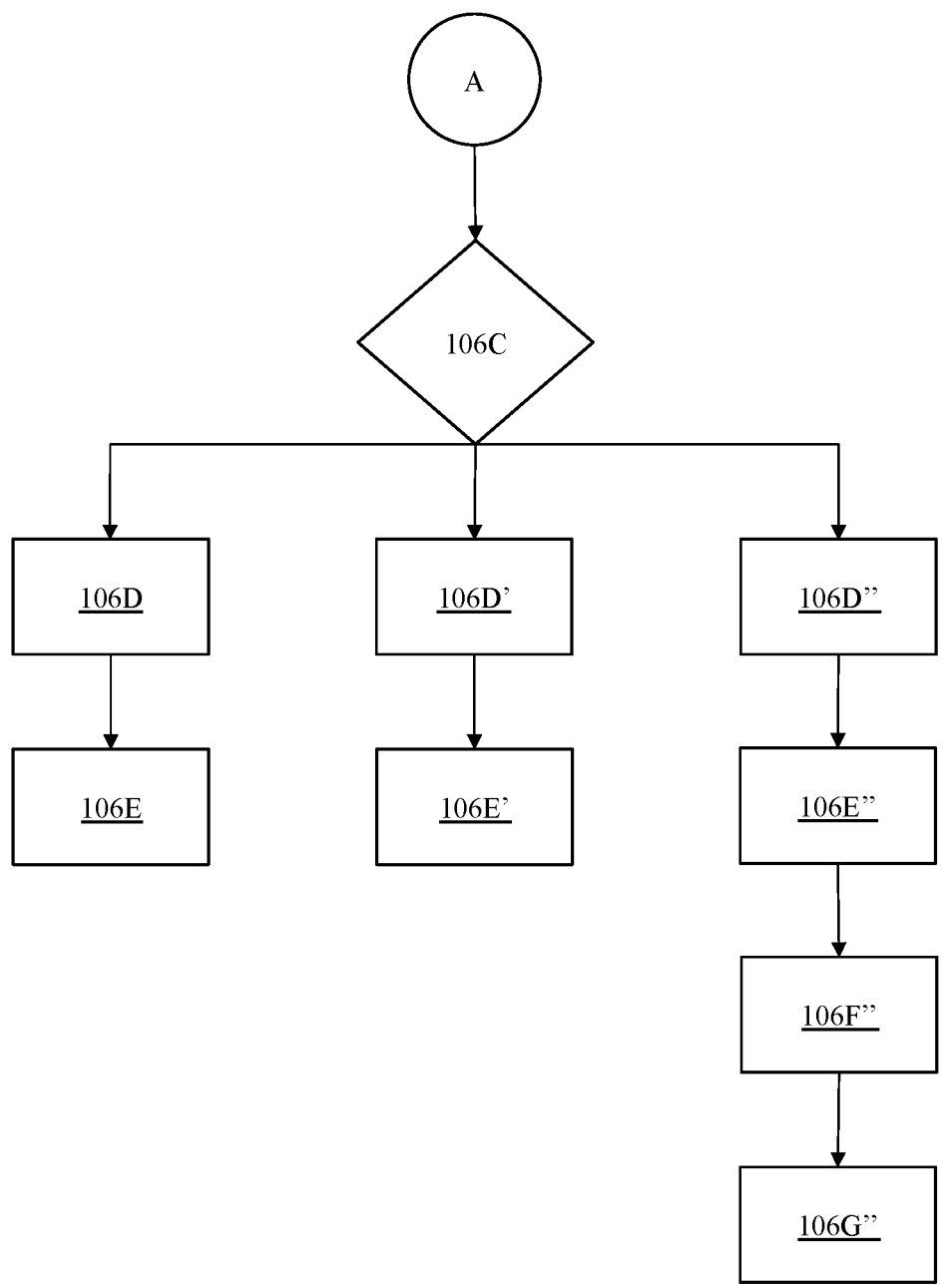

FIGS. 1A and 1B collectively are a flowchart of a method for task planning and execution based on a user query, in accordance with an embodiment of the present disclosure. The method 100 comprises steps from 102 to 106G".

Herein, the task planning and execution refers to determining a series of actions that needs to be performed in a specific manner and subsequently, executing those series of actions in the specific manner for executing any task. Notably, the task planning and execution being based on the user query implies that the task planning and execution is done for that task which is indicated in the user query.

At step 102, the user query indicative of a task associated with retrieval of data from a database comprising structured and unstructured data sources and generating a relevant response for the user query, is received. Herein, the term "user query" refers to a form of request that is raised by a user for the task planning and execution of the task that is indicated in the user query. Herein, the term "task" refers to a computer-related operation that is performed on a computing device associated with the user. Optionally, the user query is provided by the user in the form of text via the computing device associated with the user. Notably, the user query associated with the retrieval of the data from the database implies that either the task is the retrieval of the data itself or a part of the task is the retrieval of the data. It will be appreciated that the retrieval of the data relates to fetching specific information from amongst a large portion of information stored in the database.

Herein, the term "database" refers to a collection of data that is stored and managed in a way that facilitates efficient retrieval and analysis of the stored data. In an implementation, the database is stored in a data repository, and wherein the database is a vector database. Herein, the term "data repository" refers to a centralized location or storage system that is designed to store, manage, and organize data. Optionally, the data repository is a cloud based server. Herein, the term "vector database" refers to a type of database that stores and manipulates data in a vector format. A technical effect of the database being the vector database is that the efficiency in storing and handling the structured and unstructured data sources in the database is significantly improved.

Herein, the term "structured data sources" refers to those data sources in which the information is stored in a structured manner which makes the structured data sources easily searchable. Optionally, the structured data sources comprises files or documents having the data stored in the structured manner. Herein, the term "unstructured data sources" refers to those data sources in which the information is stored in unorganized manner which searching any data in the unstructured data sources challenges. Optionally, the unstructured data sources comprises multiple chunks of information of a single document or file.

In an implementation, the unstructured data sources are stored in the database in form of embeddings of portions of data present in the unstructured data sources, and the structured data sources are stored in the database in form of embeddings of a summary generated by the LLM using table names and column names of data present in the structured data sources. Herein, the term "embeddings of portions of data present in the unstructured data sources" refers to numerical representation of the information present in the unstructured data sources, in a form of vectors. Herein, the term "embeddings of a summary generated by the LLM using table names and column names of data present in the structured data sources" refers to numerical representation of the information present in the structured data sources, in a form of vectors. A technical effect is that the structured and unstructured data sources can be easily and efficiently retrieved from the database.

It will be appreciated that the retrieval of the data is done from the structured and unstructured data sources in the database. Subsequently, the task indicated in the user query being associated with generating the relevant response for the user query implies that after the data is retrieved, the relevant response containing the retrieved data is generated for efficiently providing the retrieved data to the user. Herein, the term "relevant response" refers to a response that is prepared by organizing the retrieved data in an organized manner that is relevant as a response to the user query that is provided by the user.

At step 104, the user query is parsed for determining the task associated with the retrieval of the data indicated in the user query, using a Large Language Model (LLM). Herein, the user query being parsed implies that the user query is broken down into its constituent parts in order to understand a structure and meaning of the user query. Notably, parsing the user query enables to understand and determine what is the data that is to be received in association with the task indicated in the user query. Herein, the term "Large Language Model (LLM)" refers to an artificial intelligence model that is capable of processing, understanding and generating human-like language, which makes the LLM suitable for parsing the user query. It will be appreciated that the LLM breaks down the user query into smaller constituents such as keywords, entities, and the like, for parsing the user query.

At step 106, a task plan comprising a plurality of sub-tasks for the execution of the task associated with the retrieval of the data, is generated, using the LLM. Herein, the term "task plan" refers to a plan that comprises a series of steps that are required to be performed for executing the task associated with the retrieval of the data. Notably, the plurality of sub-tasks present in the task plan are the series of steps that are to be performed for executing the task associated with the retrieval of the data. It will be appreciated that generating the task plan comprising the plurality of sub-tasks provides a specific order in which the plurality of sub-tasks are required to be executed for efficient and systematic execution of the task. Herein, the LLM utilizes its contextual understanding capabilities to determine what are the plurality of sub-tasks, and subsequently, the task plan is generated using the LLM. Notably, the LLM performs coherent and well-structured task planning for the task associated with the retrieval of the data by generating the task-plan comprising the plurality of sub-tasks.

At step 106A, for executing the plurality of sub-tasks, an embedding for the task associated with the retrieval of the data is determined. Herein, the term "embedding for the task associated with the retrieval of the data" refers to a numerical representation of words, phrases, sentences, and the like in the task associated with the retrieval of the data. Notably, the embedding for the task captures a semantic meaning and context of the task in a mathematical vector format. Herein, determining the embedding for the task makes the task suitable to be compared with the embeddings of the structured and unstructured data sources.

At step 106B, for executing the plurality of sub-tasks, a retrieval task is performed for identifying relevant structured and unstructured data sources from amongst the database for the retrieval of the data, based on the determined embedding. Herein, the term "relevant structured and unstructured data sources" refers to those structured and unstructured data sources in the database which are relevant to the data that is to be retrieved. Herein, the term "retrieval task" refers to a specific computing task that enables to identify the relevant structured and unstructured data sources from amongst all the structured and unstructured data sources stored in the database.

In an implementation, the step of performing the retrieval task further comprises performing a semantic search and a re-ranking operation over the database, to identify relevant embeddings for the relevant structured and unstructured data sources. Herein, the term "semantic search" refers to a searching technique that aims to perform searching based on a contextual understanding of the user query. Notably, performing the semantic search enables to identify the relevant structured and unstructured data sources by identifying the relevant embeddings for the relevant structured and unstructured data sources, based on the determined embedding for the task. Herein, the term "re-ranking operation" refers to an operation that enables to re-order the relevant structured and unstructured data sources based on the relevance to the task. A technical effect is that the relevant structured and unstructured data sources are accurately and efficiently identified.

At step 106C, for executing the plurality of sub-tasks, relevance scores are generated for the identified relevant structured and unstructured data sources. Herein, the term "relevance scores" refers to an indicator that determines which type of data sources from amongst the identified relevant structured and unstructured data sources are more relevant for the retrieval of the data. Notably, the relevance scores are generated by comparing the determined embedding with the embeddings of the identified relevant structured and unstructured data sources stored in the database. Optionally, the relevance scores are generated by a query interpreter.

At step 106D, for executing the plurality of sub-tasks, in an instance when the relevance scores are indicative of an unstructured pipeline, an unstructured data query engine is triggered for searching the identified relevant unstructured data sources and the data is retrieved, based on the determined embedding. Notably, the relevance scores being indicative of the unstructured pipeline implies that the identified relevant unstructured data sources from amongst the identified relevant structured and unstructured data sources are more relevant for the retrieval of the data, and subsequently, the unstructured data query engine is triggered. Herein, the term "unstructured data query engine" refers to a specific data query engine that is suitable for searching the identified relevant unstructured data sources which contains information in random and unorganized manner. Notably based on the determined embedding for the task, the unstructured data query engine is able to search and identify the data that is to be retrieved, from the identified relevant unstructured data sources.

At step 106E, for executing the plurality of sub-tasks, in the instance when the relevance scores are indicative of the unstructured pipeline, the relevant response is generated, based on the retrieved data, using the LLM. Herein, after the data is retrieved, the LLM processes and analyzes the retrieved data for generating the relevant response that is contextually appropriate for addressing the user query. Notably, generating the relevant response enables to provide the user with accurate and meaningful response based on the retrieved data.

At step 106D', for executing the plurality of sub-tasks, in another instance when the relevance scores are indicative of a structured pipeline, a structured data query engine is triggered for searching the identified relevant structured data sources and the data is retrieved, based on the determined embedding. Notably, the relevance scores being indicative of the structured pipeline implies that the identified relevant structured data sources from amongst the identified relevant structured and unstructured data sources are more relevant for the retrieval of the data, and subsequently, the structured data query engine is triggered. Herein, the term "structured data query engine" refers to a specific data query engine that is suitable for searching the identified relevant structured data sources which contains information in structured and organized manner. Notably based on the determined embedding for the task, the structured data query engine is able to search and identify the data that is to be retrieved, from the identified relevant structured data sources.

At step 106E', for executing the plurality of sub-tasks, in the another instance when the relevance scores are indicative of the structured pipeline, the relevant response based on the retrieved data is generated. Herein, after the data is retrieved, the LLM processes and analyzes the retrieved data for generating the relevant response that is contextually appropriate for addressing the user query. Notably, generating the relevant response enables to provide the user with accurate and meaningful response based on the retrieved data.

At step 106D", for executing the plurality of sub-tasks, in yet another instance when the relevance scores are indicative of a hybrid pipeline, a structured data query engine for searching the identified relevant structured data sources and retrieving a first portion of the data, based on the determined embedding. Notably, the relevance scores being indicative of the hybrid pipeline implies that some portion of the data to be retrieved is relevant to the identified relevant structured data sources, while remaining portion of the data to be retrieved is relevant to the identified relevant unstructured data sources, and subsequently, the structured data query engine is triggered first. Notably based on the determined embedding for the task, the structured data query engine is able to search and identify the first portion of the data that is to be retrieved, from the identified relevant structured data sources. Herein, the term "first portion of the data" refers to that portion of the data to be retrieved which is present in the identified relevant structured data sources.

At step 106E", for executing the plurality of sub-tasks, in the yet another instance when the relevance scores are indicative of the hybrid pipeline, the first portion of the data and the user query are received at a query transformer for transforming the received user query and the first portion of data. Herein, the term "query transformer" refers to a computing model that is able to perform modifications to the user query. Notably, the query transformer uses the first portion of data and the user query as an input to determine whether the user query needs to be modified, and if the user query needs to be modified then what changes are to be made to the user query.

At step 106F", for executing the plurality of sub-tasks, in the yet another instance when the relevance scores are indicative of the hybrid pipeline, an unstructured data query engine is triggered to search the identified relevant unstructured data sources and retrieve a second portion of the data, based on the determined embedding. Herein, the term "second portion of the data" refers to that portion of the data to be retrieved which is present in the identified relevant unstructured data sources. Notably based on the determined embedding, the unstructured data query engine is able to search and identify the second portion of the data that is to be retrieved, from the identified relevant unstructured data sources.

At step 106G", for executing the plurality of sub-tasks, in the yet another instance when the relevance scores are indicative of the hybrid pipeline, the first portion of the data and the second portion of the data are combined for generating the relevant response thereof. Herein, after the data is retrieved by combining the first portion of the data and the second portion of the data, the LLM processes and analyzes the retrieved data for generating the relevant response that is contextually appropriate for addressing the user query. Notably, generating the relevant response enables to provide the user with accurate and meaningful response based on the combined first portion of the data and second portion of the data.

In an implementation, the user query is parsed for determining whether the user query is indicative of another task. Moreover, when it is determined that the user query is indicative of another task, for executing the plurality of sub-tasks, a final response generator is triggered after retrieving the data for executing the another task using the retrieved data and a final response is generated for the user query. Herein, the term "another task" refers to another computing task apart from the task indicated associated with the retrieval of the data, wherein the another task is associated with the retrieved data. For example, the another task is to generate an email based on the retrieved data. Herein, the term "final response" refers to that response that is prepared using the retrieved data, which acts as a suitable output for the another task. Herein, the term "final response generator" refers to that computing model which uses the retrieved data as input for generating the final response. A technical effect is that the another task is effectively executed and the final response is accurately generated.

Figure 2:
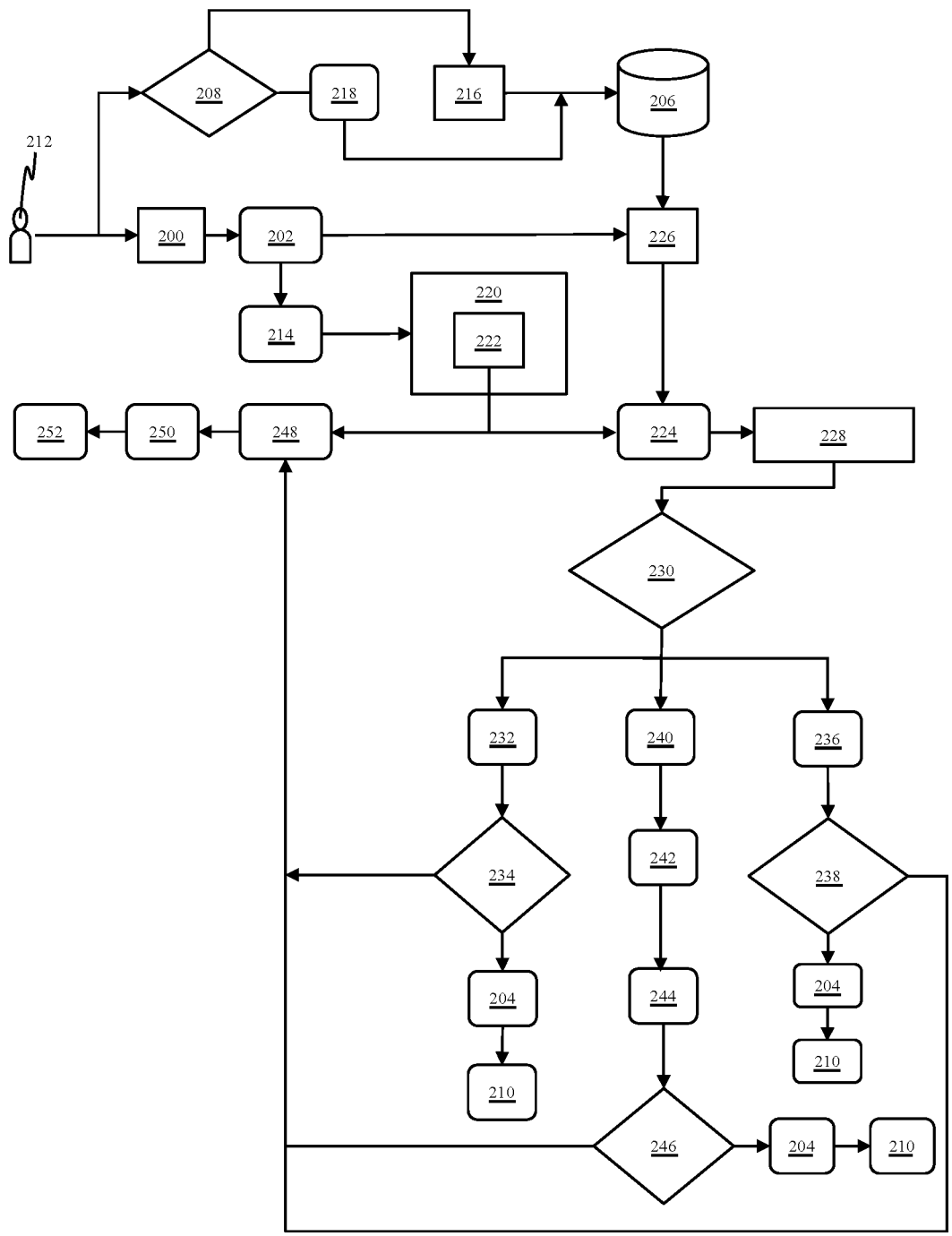
FIG. 2 is a schematic illustration of a method for task planning and execution based on a user query, in accordance with an embodiment of the present disclosure.

FIG. 2 is a schematic illustration of a method for task planning and execution based on a user query 200, in accordance with an embodiment of the present disclosure. As shown in FIG. 2, the method comprises receiving the user query 200 indicative of a task 202 associated with retrieval of data 204 from a database 206 comprising structured and unstructured data sources 208 and generating a relevant response 210 for the user query 200. Optionally, the user query 200 is received from a user 212. Moreover, the method comprises parsing the user query 200 for determining the task 202 associated with the retrieval of the data 204 indicated in the user query 200, using a Large Language Model (LLM) 214. Optionally, the unstructured data sources are stored in the database 206 in form of embeddings of portions of data 216 present in the unstructured data sources, and the structured data sources are stored in the database 206 in form of embeddings of a summary 218 generated by the LLM 214 using table names and column names of data present in the structured data sources. Furthermore, the method comprises generating a task plan 220 comprising a plurality of sub-tasks 222 for the execution of the task 202 associated with the retrieval of the data 204, using the LLM 214, wherein executing the plurality of sub-tasks 222 comprises determining an embedding 224 for the task 202 associated with the retrieval of the data 204. Moreover, executing the plurality of sub-tasks 222 comprises performing a retrieval task 226 for identifying relevant structured and unstructured data sources 228 from amongst the database 206 for the retrieval of the data 204, based on the determined embedding 224. Furthermore, executing the plurality of sub-tasks 222 comprises generating relevance scores 230 for the identified relevant structured and unstructured data sources 228, based on the determined embedding 224. Furthermore, in an instance, when the relevance scores 230 are indicative of an unstructured pipeline 232, executing the plurality of sub-tasks 222 comprises triggering an unstructured data query engine 234 for searching the identified relevant unstructured data sources and retrieving the data 204, based on the determined embedding 224, and generating the relevant response 210 based on the retrieved data 204, using the LLM 214. Furthermore, in another instance, when the relevance scores 230 are indicative of a structured pipeline 236, executing the plurality of sub-tasks 222 comprises triggering a structured data query engine 238 for searching the identified relevant structured data sources and retrieving the data 204, based on the determined embedding 224, and generating the relevant response 210 based on the retrieved data 204, using the LLM 214. Furthermore, in yet another instance, when the relevance scores 230 are indicative of a hybrid pipeline 240, executing the plurality of sub-tasks 222 comprises triggering a structured data query engine 238 for searching the identified relevant structured data sources and retrieving a first portion of the data 242, based on the determined embedding 224. Furthermore, in the yet another instance, when the relevance scores 230 are indicative of the hybrid pipeline 240, executing the plurality of sub-tasks 222 comprises receiving the first portion of the data 242 and the user query 200 at a query transformer 244 for transforming the received user query 200 and the first portion of data 242. Furthermore, in the yet another instance, when the relevance scores 230 are indicative of the hybrid pipeline 240, executing the plurality of sub-tasks 222 comprises triggering an unstructured data query engine 234 for searching the identified relevant unstructured data sources and retrieving a second portion of the data 246, based on the determined embedding 224. Furthermore, in the yet another instance, when the relevance scores 230 are indicative of the hybrid pipeline 240, executing the plurality of sub-tasks 222 comprises combining the first portion of the data 242 and the second portion of the data 246 for generating the relevant response 210 thereof. Optionally, the method further comprises parsing the user query 200 for determining whether the user query 200 is indicative of another task 248, and when it is determined that the user query 200 is indicative of another task 248, executing the plurality of sub-tasks 222 further comprises triggering a final response generator 250 after retrieving the data 204 for executing the another task 248 using the retrieved data 204 and generating a final response 252 for the user query 200.

Figure 3:
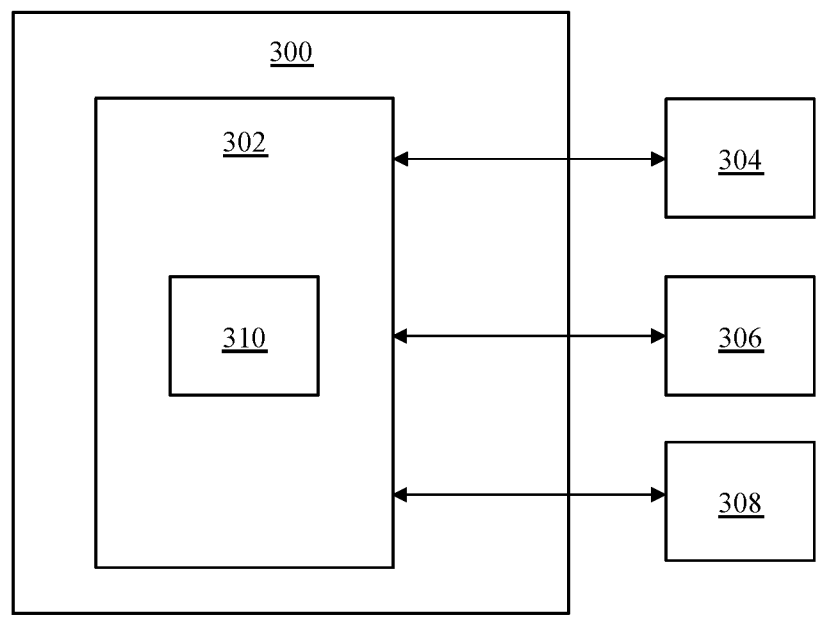
FIG. 3 is a block diagram of a system for task planning and execution based on a user query, in accordance with an embodiment of the present disclosure.

FIG. 3 is a block diagram for a system 300 for task planning and execution based on a user query, in accordance with an embodiment of the present disclosure. As shown in FIG. 3, the system 300 comprises a processor 302. The processor 302 is configured to receive the user query indicative of a task associated with retrieval of data from a database comprising structured and unstructured data sources and generate a relevant response for the user query. Moreover, the processor 302 is configured to parse the user query to determine the task associated with the retrieval of the data indicated in the user query, using a Large Language Model (LLM) 304. Furthermore, the processor 302 is configured to generate a task plan comprising a plurality of sub-tasks for the execution of the task associated with the retrieval of the data, using the LLM 304, wherein to execute the plurality of sub-tasks, the processor is further configured to determine an embedding for the task associated with the retrieval of the data. Moreover, to execute the plurality of sub-tasks, the processor 302 is configured to perform a retrieval task to identify relevant structured and unstructured data sources from amongst the database for the retrieval of the data, based on the determined embedding. Furthermore, to execute the plurality of sub-tasks, the processor 302 is configured to generate relevance scores for the identified relevant structured and unstructured data sources, based on the determined embedding. Furthermore, in an instance when the relevance scores are indicative of an unstructured pipeline, to execute the plurality of sub-tasks, the processor 302 is configured to trigger an unstructured data query engine 306 to search the identified relevant unstructured data sources and retrieve the data, based on the determined embedding, and generate the relevant response based on the retrieved data. Furthermore, in another instance when the relevance scores are indicative of a structured pipeline, to execute the plurality of sub-tasks, the processor 302 is configured to trigger a structured data query engine 308 to search the identified relevant structured data sources and retrieve the data, based on the determined embedding, and generate the relevant response based on the retrieved data. Furthermore, in yet another instance when the relevance scores are indicative of a hybrid pipeline, to execute the plurality of sub-tasks, the processor 302 is configured to trigger a structured data query engine 308 to search the identified relevant structured data sources and retrieve a first portion of the data, based on the determined embedding. Furthermore, in the yet another instance when the relevance scores are indicative of the hybrid pipeline, to execute the plurality of sub-tasks, the processor 302 is configured to receive the first portion of the data and the user query at a query transformer 310 in the processor 302 to transform the retrieved user query and the first portion of data. Furthermore, in the yet another instance when the relevance scores are indicative of the hybrid pipeline, to execute the plurality of sub-tasks, the processor 302 is configured to trigger an unstructured data query engine 306 to search the identified relevant unstructured data sources and retrieve a second portion of the data, based on the determined embedding. Furthermore, in the yet another instance when the relevance scores are indicative of the hybrid pipeline, to execute the plurality of sub-tasks, the processor 302 is configured to trigger the LLM in 304 to combine the first portion of the data and the second portion of the data to generate the relevant response thereof.

Herein, the term processor 302 refers to a computational element that is operable to execute the system 300. Examples of the processor 302 include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor 302 may refer to one or more individual processors, processing devices and various elements associated with a processing device that may be shared by other processing devices. Additionally, one or more individual processors, processing devices and elements are arranged in various architectures for responding to and processing the instructions that execute the system 300.

In an implementation, the database is stored in a data repository communicably coupled to the processor 302, and wherein the database is a vector database.

In an implementation, the unstructured data sources are stored in the database in form of embeddings of portions of data present in the unstructured data sources, and the structured data sources are stored in the database in form of embeddings of a summary generated by the LLM 304 using table names and column names of data present in the structured data sources.

In an implementation, the processor 302 is further configured to:
- parse the user query to determine whether the user query is indicative of another task; and
- when it is determined that the user query is indicative of another task, to execute the plurality of sub-tasks, the processor 302 is further configured to:
  - trigger a final response generator after retrieving the data for executing the another task using the retrieved data and generate a final response for the user query.

In an implementation, to perform the retrieval task, the processor 302 is further configured to perform a semantic search and a re-ranking operation over the database, to identify relevant embeddings for the relevant structured and unstructured data sources.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A method for task planning and execution based on a user query (200), the method comprising:
   - receiving the user query indicative of a task (202) associated with retrieval of data (204) from a database (206) comprising structured and unstructured data sources (208) and generating a relevant response (210) for the user query;
   - parsing the user query for determining the task associated with the retrieval of the data indicated in the user query, using a Large Language Model (LLM) (214, 304);
   - generating a task plan (220) comprising a plurality of sub-tasks (222) for the execution of the task associated with the retrieval of the data, using the LLM, wherein executing the plurality of sub-tasks comprises:
     - determining an embedding (224) for the task associated with the retrieval of the data,
     - performing a retrieval task (226) for identifying relevant structured and unstructured data sources (228) from amongst the database for the retrieval of the data, based on the determined embedding,
     - generating relevance scores (230) for the identified relevant structured and unstructured data sources, based on the determined embedding, and
     - when the relevance scores are indicative of an unstructured pipeline (232):
       - triggering an unstructured data query engine (234, 306) for searching the identified relevant unstructured data sources and retrieving the data, based on the determined embedding, and
       - generating the relevant response based on the retrieved data, using the LLM, or
     - when the relevance scores are indicative of a structured pipeline (236):
       - triggering a structured data query engine (238, 308) for searching the identified relevant structured data sources and retrieving the data, based on the determined embedding, and
       - generating the relevant response based on the retrieved data, or
     - when the relevance scores are indicative of a hybrid pipeline (240):
       - triggering a structured data query engine for searching the identified relevant structured data sources and retrieving a first portion of the data (242), based on the determined embedding,
       - receiving the first portion of the data and the user query at a query transformer (244, 310) for transforming the received user query and the first portion of data,
       - triggering an unstructured data query engine for searching the identified relevant unstructured data sources and retrieving a second portion of the data (246), based on the determined embedding, and
       - combining the first portion of the data and the second portion of the data for generating the relevant response thereof.

2. The method as claimed in claim 1, wherein the database (206) is stored in a data repository, and wherein the database is a vector database.

3. The method as claimed in claim 1, wherein the unstructured data sources are stored in the database (206) in form of embeddings of portions of data (216) present in the unstructured data sources, and the structured data sources are stored in the database in form of embeddings of a summary (218) generated by the LLM (214, 304) using table names and column names of data present in the structured data sources.

4. The method as claimed in claim 1, further comprising:
   - parsing the user query (200) for determining whether the user query is indicative of another task (248); and
   - when it is determined that the user query is indicative of another task, executing the plurality of sub-tasks (222) further comprising:
     - triggering a final response generator (250) after retrieving the data for executing the another task using the retrieved data and generating a final response for the user query.

5. The method as claimed in claim 1, wherein the step of performing the retrieval task (226) further comprises performing a semantic search and a re-ranking operation over the database (206), to identify relevant embeddings for the relevant structured and unstructured data sources (228).

6. A system (300) for task planning and execution based on a user query (200), the system comprising a processor (302) configured to:
  receive the user query indicative of a task (202) associated with retrieval of data (204) from a database (206) comprising structured and unstructured data sources (208) and generate a relevant response (210) for the user query;
  parse the user query to determine the task associated with the retrieval of the data indicated in the user query, using a Large Language Model (LLM) (214, 304);
  generate a task plan (220) comprising a plurality of sub-tasks (222) for the execution of the task associated with the retrieval of the data, using the LLM, wherein to execute the plurality of sub-tasks, the processor is further configured to:
    determine an embedding (224) for the task associated with the retrieval of the data,
    perform a retrieval task (226) to identify relevant structured and unstructured data sources (228) from amongst the database for the retrieval of the data, based on the determined embedding,
    generate relevance scores (230) for the identified relevant structured and unstructured data sources, based on the determined embedding, and
    when the relevance scores are indicative of an unstructured pipeline (232):
      trigger an unstructured data query engine (234, 306) to search the identified relevant unstructured data sources and retrieve the data, based on the determined embedding, and
      generate the relevant response based on the retrieved data, or
    when the relevance scores are indicative of a structured pipeline (236):
      trigger a structured data query engine (238, 308) for searching the identified relevant structured data sources and retrieving the data, based on the determined embedding, and
      generate the relevant response based on the retrieved data, or
    when the relevance scores are indicative of a hybrid pipeline (240):
      trigger a structured data query engine to search the identified relevant structured data sources and retrieve a first portion of the data (242), based on the determined embedding,
      receive the first portion of the data and the user query at a query transformer (244, 310) in the processor to transform the retrieved user query and the first portion of data,
      trigger an unstructured data query engine to search the identified relevant unstructured data sources and retrieve a second portion of the data (246), based on the determined embedding, and
      combine the first portion of the data and the second portion of the data to generate the relevant response thereof.

7. The system (300) as claimed in claim 6, wherein the database (206) is stored in a data repository communicably coupled to the processor, and wherein the database is a vector database.

8. The system (300) as claimed in claim 6, wherein the unstructured data sources are stored in the database (206) in form of embeddings of portions of data present in the unstructured data sources, and the structured data sources are stored in the database in form of embeddings of a summary generated by the LLM (214, 304) using table names and column names of data present in the structured data sources.

9. The system (300) as claimed in claim 6, wherein the processor (302) is further configured to:
  parse the user query (200) to determine whether the user query is indicative of another task (248); and
  when it is determined that the user query is indicative of another task, to execute the plurality of sub-tasks (222), the processor is further configured to:
    trigger a final response generator (250) after retrieving the data for executing the another task using the retrieved data and generate a final response for the user query.

10. The system (300) as claimed in claim 6, wherein to perform the retrieval task (226), the processor (302) is further configured to perform a semantic search and a re-ranking operation over the database (206), to identify relevant embeddings for the relevant structured and unstructured data sources (228).

* * * * *